United States Patent [19]

Dold

[11] 4,423,631

[45] Jan. 3, 1984

[54] CONSTRUCTION OF A HOUSING, PARTICULARLY FOR TACHOGRAPHS, AND OF A COVER PIVOTALLY ARRANGED ON THE HOUSING

[75] Inventor: Berthold Dold, Schramberg, Fed. Rep. of Germany

[73] Assignee: Kienzle Apparate GmbH, Villingen, Fed. Rep. of Germany

[21] Appl. No.: 324,809

[22] Filed: Nov. 25, 1981

[30] Foreign Application Priority Data

Dec. 6, 1980 [DE] Fed. Rep. of Germany ....... 3046118

[51] Int. Cl.³ ............................................ G01D 11/24

[52] U.S. Cl. ....................................... 73/431; 346/145

[58] Field of Search ................. 73/431; 346/18, 33 D, 346/145; 324/156; 312/22, 26

[56] References Cited

U.S. PATENT DOCUMENTS

| | | | |
|---|---|---|---|
| 2,982,594 | 5/1961 | Riegger et al. | 346/18 |
| 3,983,566 | 9/1976 | Vogtlin | 346/18 |
| 4,211,337 | 7/1980 | Weavers et al. . | |

*Primary Examiner*—S. Clement Swisher

*Attorney, Agent, or Firm*—Toren, McGeady and Stanger

[57] ABSTRACT

A housing for an instrument, particularly of the type for indicating and recording speed. A front cover includes a window through which the indicator is visable.

The cover is hinged to the housing on a horizontal axis spaced from the housing base so that the bottom of the cover swings inwardly of the housing while the top of the cover swings downwardly revealing a recording apparatus on its inner surface.

4 Claims, 5 Drawing Figures

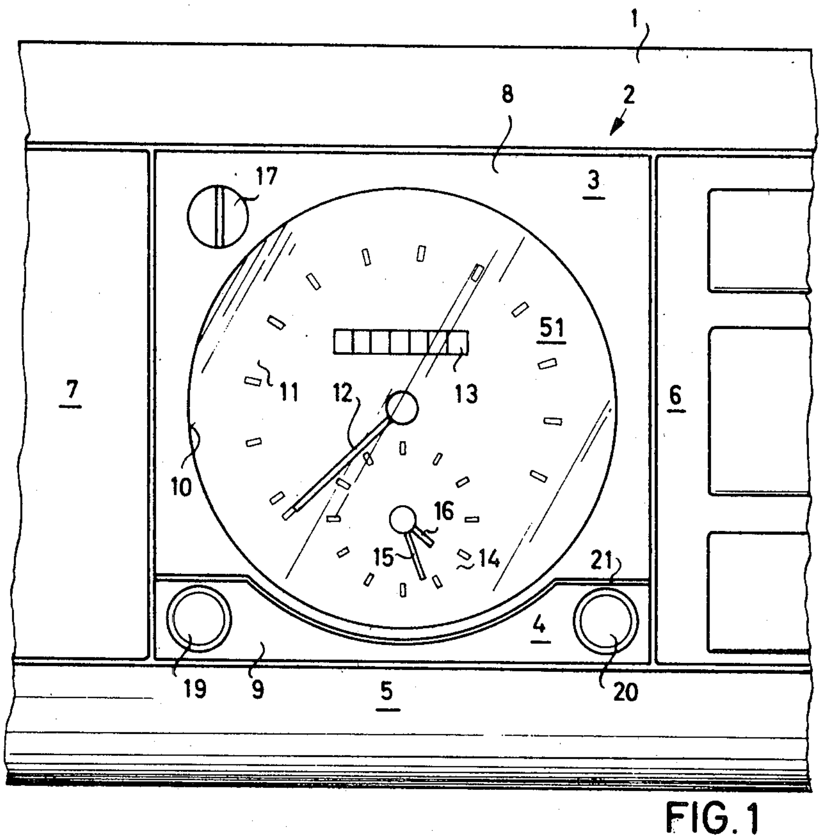
FIG.1
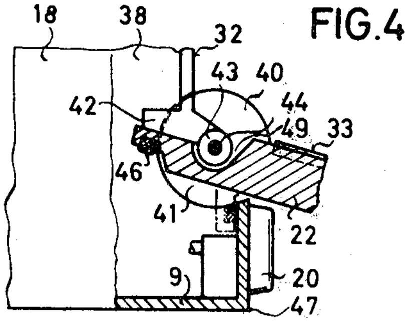
FIG.4
FIG.5
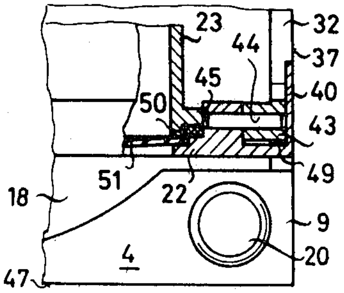

CONSTRUCTION OF A HOUSING, PARTICULARLY FOR TACHOGRAPHS, AND OF A COVER PIVOTALLY ARRANGED ON THE HOUSING

The invention relates to the construction of a housing, particularly for tachographs, and of a cover pivotally arranged on the housing. At the front of the cover a window is provided which makes it possible at least to view different indicating means which are arranged in the cover.

The structural concept of the conventional tachographs is determined, as is known, by the diameter of the diagram charts which are used as the recording carriers and by their recording position in the tachograph, i.e. in a plane which is perpendicular to the axis of the device, wherein the diameter of the diagram charts cannot be selected at random due to the plurality of data to be recorded and a still adequate capacity of resolution of the recordings. It is also decisive that in the cover different functional groups, however at least indicators for the speed and a drive mechanism which serves to drive the diagram charts, as well as suitable centering and engagement means for the diagram charts, are arranged, that the reverse side of the cover which faces the housing and which serves as guidance and recording foundation for the diagram charts recedes relatively deeply into the housing when the cover is closed, and that the cover is pivotal in such a way that the inserted diagram chart faces the viewer when the cover is open in, if possible, all installation situations which arise for the tachograph.

The main reason for such a concept in which the diagram charts are assigned directly to the cover and are pivoted with the cover about an axis which lies outside with regard to the housing, was to guarantee a problem-free operation of the tachograph during random checks of the recordings and during exchange of the diagram charts.

This consideration which was essentially directed to the device and the thus resulting construction left installation problems unconsidered to a great extent and often made it necessary to adapt the instrument panel to the structural conditions of the device. Special difficulties, however, resulted in this type of device in the preferred installation, i.e. when the tachograph, in order to do justice to its indicating function, was arranged in the viewing direction of the driver, i.e. in the area of the steering wheel, where, of course, the space which is necessary to pivot the cover upwardly hardly ever exists. On the other hand, modern design trends require that the instrument panels of commercial vehicles have for instance a division into rectangular fields for optically separating individual instruments, groups of instruments or operating groups from one another and that these instruments are arranged in such a way that their front surfaces or the top surfaces of these fields lie in one and the same plane, and that also the tachograph can be installed flush, i.e. adaptable in its height, and cannot only be mounted "placed on top", as was the case to date.

If now, as was already done, conventional tachographs are fitted using suitable holders and front covers, i.e. are arranged in the corresponding instrument panel in a recessed manner, in order to be able to open the cover with the necessary angle of traverse to change the diagram charts, due to the not inconsiderable distance between the swivel axis of the cover and the front area, in any case a larger cutout, i.e. depending on the height of installation, in the instrument panel is necessary than was required to date corresponding to the housing cross-section for installation of the tachograph. Such an installation therefore represents a rather unsatisfactory and complicated auxiliary measure, particularly since this installation only permits in a few cases a harmonic incorporation of the tachographs into the specific instrument panel design.

The mentioned installation problems can be circumvented to a great extent by means of a known type of tachograph in which the swivel axis of the cover is provided on the inside with respect to the housing and the base area of the cover represents only a part of the cross-sectional area of the device, however considerable disadvantages must be accepted in this solution, for instance that a separating line extends transversely through the front surface of the tachograph and that the cross-sectional surface of the tachograph is only partially available for the speed indicator. In addition, this solution in which the cover during opening by means of a suitable hinge construction is, so to speak, lifted out of the device or lifted away from the device and this causes sealing problems which are difficult to control.

It is, therefore, the task of the present invention to find a housing construction which optimally meets the different requirements which today must be made regarding the installation of tachographs, in which particularly the space which is needed to pivot the cover is reduced, however the indicating surface is created as large as possible, i.e., the indicating surface is substantially of the size of the cross-sectional surface of the housing, and which offers sufficient flexibility of installation in view of more design freedom in the creation of the instrument panel.

The solution of this task provides that the cover is connected with the housing in two separate bearings in such a way that when the cover is opened a part of the cover recedes into the housing, and that at the housing at least one extension, which is assigned to the receding part of the cover, is constructed in the front with a surface which lies essentially in the plane of the front surface of the cover and with at least one edge which is formed by intersection of this surface with the adjoining housing wall, independently of the cover.

In addition, the found solution is characterized in that the window cutout of the cover, relative to the cross-sectional area of the housing, is created in such a way to fill out the area that the swivel axis of the cover intersects with the window cutout.

A preferred exemplified embodiment is characterized in that the housing is of square construction and that the end faces of the cover and the housing which are located transversely to the swivel axis lie essentially in one plane, that, in the respective side walls of the housing, cutouts are constructed which permit pivoting of the cover, and that the cutouts as well as the bearing points can be covered at the end face, at least in the closed state of the cover, by means of wall elements which are formed on at the cover on the same surface with its end faces.

Below the already mentioned exemplified embodiment of the invention is elucidated with the aid of the enclosed drawing. In the drawing:

FIG. 1 shows the front view of a tachograph together with the surrounding outline of the instrument panel.

FIG. 4 shows a partial sectional representation through one of the two bearings of the cover according to line A-B in FIG. 3.

FIG. 5 shows a partial sectional representation through one of the two bearings of the cover according to line C-D in FIG. 3.

Not to mention that the subject matter of the invention satisfactorily solves the defined task in all partial areas, it can be used in square as well as in cylindrical housings and permits a tachograph construction which is aestetically advantageous as well as spatially relatively compact. It also permits a consistent sealing action between the cover and the housing and prevents difficulty in installation due to possible parallelism differences due to tolerances between the swivel axis of the cover and the parallel instrument panel outlines in that at least one edge of the housing, i.e. a fixed edge of the tachograph, lies in its frontal area and consequently alignment of the tachograph with respect to the instrument panel, particularly if according to the exemplified embodiment the tachograph is constructed without an overlapping edge, can take place with a minimum alignment effort. It is also important that with the found solution the problem of the pivot gap between the movable cover and the adjacent equipment panel outlines or the fixed housing outline which is particularly disadvantageous from the aesthetic point of view is prevented.

Figure 2:
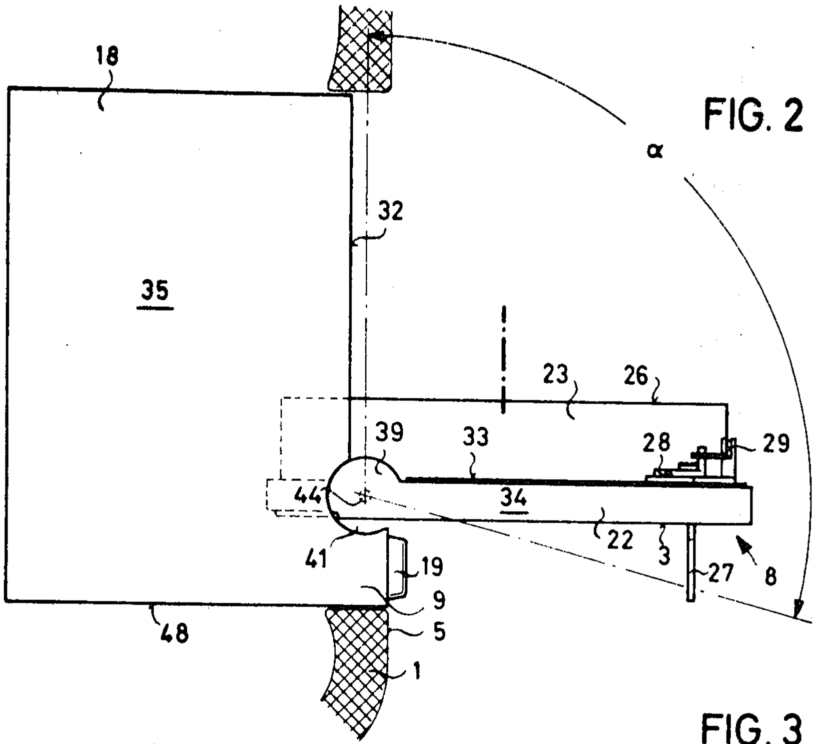
FIG. 2 shows a schematic side view of the construction according to the invention of the cover and housing.

In an instrument panel 1 of which a section is shown in FIG. 2 a tachograph 2 is arranged in such a way that its frontal areas 3 and 4 and, for instance, an adjacent partial area 5 of the instrument panel 1 are located essentially in one plane. The instrument frontal areas 6 and 7 which are adjacent to the tachograph 2 are also constructed to be in the same plane with the frontal areas 3 and 4 of the instrument panel area 5 which results in a flat overall appearance of the vehicle instrumentation. For the sake of completeness, it is also mentioned that the frontal areas 3 and 4 of the tachograph 2 are constructed on one side at the cover 8 which can pivot to an open position and on the other side at a housing extension 9 which will still be further described, and that through a circular window 10 which is constructed in the cover 8 at least the speed indicating means 11, 12, a distance counter 13 as well as time indicating means 14, 15, and 16 are visible. The cover 8 at which, of course, also a rectangular or square window cutout may be constructed can be locked in a manner known per se by means of a lock 17 with the housing 18 which in the selected embodiment is square (FIG. 2), while the setting knobs 19 and 20 serve as usual for preselection of registration of the working time. A front separating line between the cover 8 and the housing 18 is identified with 21.

The side view (FIG. 2) in which the intended flush installation of the tachograph 2 in the instrument panel 1 is indicated, as well as the top view (FIG. 3) shows—for the sake of simplicity, illustrations of elements of a tachograph which are not essential to the invention are omitted—that the cover 8 which may be constructed in a manner known per se as a one-piece, cup-shaped housing or, as shown, consists essentially of a frame 22 and hood 23 connected therewith—completed in FIG. 5 with a sealing ring 50 and a front panel 51. The reverse side of the cover or the side 26 which faces the housing serves as guide surface and recording foundation for the not-shown diagram charts and is connected with the housing 18 in two aligned, however spatially separated bearings 24 and 25. The characterizing feature of this arrangment is that the spatial position of the bearing points 24 and 25 is selected in such a way that the cover 8 during opening—the maximum angle of traverse is identified in FIG. 2 with $\alpha$—partially recedes into the housing 18. Consequently the diameter of the window cutout 10 may be larger than the turning radius of the contours of the cover 8 which pivots out the farthest. Therefore in the chosen concept, if the window cutout 10 in relation to the cross-sectional area of the housing 18 is constructed to a great extent to fill out the area, the window cutout 10 is crossed by the swivel axis of the cover 8.

Figure 3:
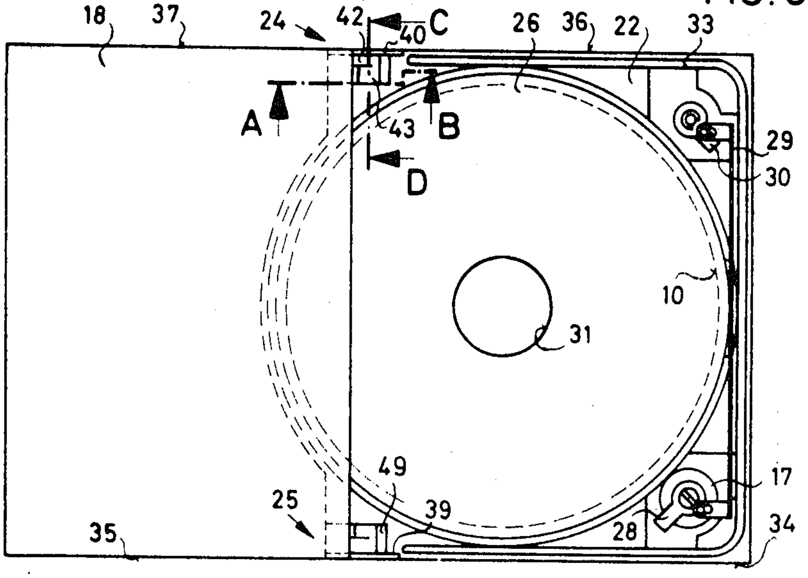
FIG. 3 shows a top view projected from FIG. 2.

It can also be concluded from FIGS. 2 and 3 that the cover 8 is held closed at two areas, preferably in the region of the two corners which pivot outwardly. Therefore to the lock 17 or its lock body and to the bolt 28 which is fastened in the lock, a bolt 30 is assigned which is coupled by means of a connecting rod 29 which is mounted in the cover 8 in a suitable manner. The key 27 serves in a known manner as a handle for pivoting the cover 8, while an opening 31 which is constructed in the cover 8 is provided for the passage of not-shown centering and engagement means associated with the diagram charts. It shall also be mentioned that with the closing plane between the outwardly pivoting part of the cover 8 and the housing 18 or the contact surface 32 at the housing 18 a gasket cord 33 which is inserted in a suitable groove in the cover 8 is associated and that preferably, differing from the representation in FIG. 2, the swivel axis of the cover 8 is constructed to lie in the closing plane and possibly not parallel to the frontal area 3. It is also evident that the end faces 34 and 36 of the cover 8 as well as the outer areas 35 and 37 of the lateral walls of the housing 18 of which one is identified with 38 in FIG. 4 always lie in one plane, and that wall elements 39 and 40 are constructed at the cover 8 in the same area as the end faces 34 and 36. The wall elements serve to cover, at least in the closed state of the cover 8, the bearing points 24 and 25 and the cutouts 41 which are required in the lateral walls of the housing 18 for pivoting of the cover 8. The transitions between the wall elements 39 and 40 and the lateral walls of the housing 18 may be constructed as labyrinth seals in form of a web which engages into a circumferential groove.

FIGS. 4 and 5 show in detail that in gudgeons 43 which are constructed at wall reinforcements 42, pivot pins 44 are attached and that the frame 22 of the cover 8 has bearing bores 45 which are associated to the pivot pins 44 and recesses 49 which are associated with the gudgeons 43. Of course, the reverse is also conceivable that the pivot pins 44 are attached in the frame 22. In addition, the wall reinforcments 42 serve as stops for the cover 8 in that they interact with the part of the cover 8 which pivots inwardly, and the cover 8 when closed rests under interposition of a gasket cord 46 which is inserted in the cover 8 at the inside of the housing extension 9 in accordance with FIG. 4.

It is to be added that the housing extension 9 which, if necessary for reasons of shape, for instance when the housing 18 is to be constructed with an intermediate wall, can also be constructed as an additional part and can be firmly connected with the housing 18, has an edge 47 which is formed by means of intersection of the frontal area 4 with the adjoining housing wall 48. This edge which, so to speak, has a stop edge permits a problem free alignment of the tachograph 2 during installation into the instrument panel of a vehicle.

It is also to be mentioned that the separating line between the cover 8 and the housing extension 9 may also be of straight construction, wherein, if the square housing cross-section is to be maintained, a relatively narrow housing extension 9 would have to be constructed and the setting knobs 19, 20 for the working time would have to be assigned to the cover. If, however, for instance a cylindrical housing is selected, then the frontal area of the housing extension will in any case be a relatively narrow, annular section so that the setting knobs for the working time are constructed preferably as key buttons or sliding elements.

I claim:

1. Construction of a housing, particularly for tachographs, and of a cover which is pivotally arranged at said housing, at the front of said cover a window is provided which makes possible at least the observation of different indicating means arranged in said cover, characterized in that said cover 8 is connected with said housing 18 in two separate bearings 24, 25 in such a way that during opening of said cover a part thereof recedes into said housing, and that at said housing 18 at least one extension 9 which is assigned to the receding part of said cover 8 and has a frontal area 4 which lies essentially in the plane of the frontal area 3 of said cover, and at least one edge 47 which is independent from the cover and is formed by intersection of said area 4 with the adjoining housing wall 48.

2. Construction according to claim 1, characterized in that a window cutout 10 of said cover 8, related to the cross-sectional area of the housing 18, is constructed to fill out the area in such a way that the swivel axis of said cover 8 crosses said window cutout 10.

3. Construction according to claim 1, characterized in that in the closed position of said cover 8 said extension 9 at said housing 18 offers a contact surface for the part of said cover which recedes into said housing 18, and that between said extension 9 and said cover 8 sealing means 46 are constructed.

4. Construction according to claim 1, characterized in that said housing 18 is constructed to be square and that the end faces 34, 36 and 35, 37 of said cover 8 and said housing 18 which are located transversely to the swivel axis always lie essentially in one plane, that in the respective side walls of said housing 18 cutouts 41 are constructed which make it possible to pivot the cover 8 open, and that said cutouts 41 as well as said bearings 24, 25 can be covered at the end face, at least when said cover 8 is in the closed state, by means of wall elements 39, 40 which are formed at said cover 8 in the same area as the end faces 34, 36.

* * * * *